United States Patent Office 3,370,954
Patented Feb. 27, 1968

3,370,954
LOW ASH CONTENT FOOD SUPPLEMENT METHOD
William Kuster, Hillsborough, Calif., assignor, by mesne assignments, to Eagle-Ottawa Leather Company, Grand Haven, Mich., a corporation of Illinois
No Drawing. Filed Mar. 4, 1963, Ser. No. 262,385
6 Claims. (Cl. 99—7)

This invention relates to a new and improved method for preparing a nutritional feed supplement rich in protein that is obtained from high ash content animal by-products through acid hydrolysis, and the product obtained therefrom. More particularly, the invention provides such a method wherein phosphoric acid is used for the hydrolysis of the high ash content starting materials and the product therefrom is characterized by its relatively lower ash content. The product is obtained in either a paste consistency or dry form and may be used for feeding to humans as well as animals.

The present invention is related to the invention described and claimed in United States Patent No. 3,000,742 patented Sept. 19, 1961. The present invention in most respects follows the same general techniques there involved. The present invention differs from said patent in that it is operable upon relatively high ash content animal by-products, i.e. the animal by-products contain calcium hydroxide, calcium carbonate, and/or tri-calcium phosphate which comprises at least about 15-20% by weight of the protein content thereof or more, and the resulting product is relatively low in ash content as desired. For example, the final product may be prepared so as to contain 15-20% ash with respect to the total composition, or as little as 5% or less where human consumption is contemplated. These results are obtainable from such starting materials as chicken heads and feet where the bone content is very high and therefore hitherto not usable for present purposes. Further, in one aspect of the present invention, a dry product may be obtained as contrasted with the paste consistency of the product described in said patent.

Accordingly, the present invention provides a method comprising hydrolyzing animal by-products which contain a member of the group consisting of calcium hydroxide, calcium carbonate, tri-calcium phosphate (and which may also contain strontium compounds and isotopes of strontium) and mixtures thereof constituting at least about 15-20% by weight of the protein content thereof with phosphoric acid at a pH of about 1-3 in aqueous solution and at an elevated temperature until the protein reaches about the polypeptide state of hydrolysis. At that stage an aqueous phase containing the polypeptide is recovered. The pH of the recovered phase is then raised to about 5-7 by adding thereto sufficient calcium oxide, hydroxide, or carbonate. The amount of calcium compound added will govern the amount of precipitate formed for removal and thereby control the final ash content. Operation within the pH ranges noted will generally result in acceptable products of low ash content although some deviation may be desired depending upon the starting material and hydrolysis conditions employed. Where more ash is desired in the final product, less calcium compound is added and the lower pH's are observed, while when less ash is sought in the end product (and in the presence of radioactive isotopes), more calcium compound is added and the higher pH's to about pH 8 are observed. Upon the addition of the selected compound, insoluble phosphate salts are formed and removed from the liquid phase protein. (Small amounts of undesirable isotopes are co-precipitated if present and can thereby be removed.) The water content of the aqueous phase protein may then be reduced to a preselected amount.

As will be appreciated by those skilled in the art, the calcium compound forms insoluble di-calcium phosphates from the soluble mono-calcium phosphates present in the aqueous phase hydrolyzate and are readily separable therefrom. On the other hand, even if some of these calcium salts are present in the final product, they are not deleterious to health but in fact are beneficial to health since they contain both the essential nutritional elements calcium and phosphorus. Thus it generally will not require that all of the precipitate be removed and only the coarse particles may be separated while the fine particles are allowed to remain. The removal step is herein generally used in this sense.

As noted, the calcium additive is employed in the form of a carbonate, oxide, or hydroxide. By using such a form, extraneous ions are not introduced during the reaction producing the insoluble phosphate salt.

Since the phosphates in solution are precipitated and removed in the foregoing steps, the end product will have a low or substantially no ash content. The final consistency of the end product will in large measure be determined by the amount of water allowed to remain in the aqueous protein phase after separation from the precipitate, and by the amount of fat present in combination therewith.

As described in the above cited patent, during the hydrolysis step including the application of heat to the reaction mixture, the fat present in the animal by-products becomes liquified. In the preferred embodiment, the liquified fat is recovered along with the aqueous phase polypeptide protein, and the fat content is reduced at a convenient time such as prior to precipitation of the phosphate. In accordance with prior techniques the fat level is adjusted so that when the water is reduced after phosphate precipitation, a homogeneous paste-like consistency of the protein and fat is obtained as a final product where such consistency is sought.

Alternatively, it may be desired to have the final product in a substantially dry condition. In this event the teachings described and claimed in copending application Ser. No. 262,384 filed Mar. 4, 1963, now U.S. Patent No. 3,301,681, granted January 31, 1967 are utilized after the phosphate precipitation. This briefly involves reducing the water content of the aqueous phase protein following precipitation and removal of the phosphate to as low a point as possible before the product becomes too tacky for further handling. As discussed in said copending application, this point varies depending upon the composition of the materials utilized and will usually permit water reduction to about less than 30% and generally in the range of about 7-30%.

The product here involved after ash precipitation and removal will be low in ash content. Therefore subsequent water reduction can generally not be carried much beyond the point where the water is equal to the protein content by weight before the product becomes undesirably tacky.

At the lowest permitted water content point, stoichiometric quantities of phosphoric acid and calcium in the carbonate, oxide, or hydroxide form are suitably added to the product. (The acid is needed because the phosphates have been precipitated as noted.) This results in the formation of a di-calcium phosphate salt containing 2 waters of hydration. The water of hydration is obtained from the moisture that remains in the product. If the water content has been suitably lowered previously and sufficient phosphoric acid and calcium compound are added to tie up the necessary amount of the remaining moisture, a substantially dry end product is obtained. It will be appreciated that obtaining a dry product in this manner introduces some ash into the product, with more water to be removed the more ash that need be formed to combine therewith. However, the ash level introduced by this technique will be relatively low (compared to the amount previously removed) and for many purposes may be tolerated.

It is to be noted that a "dry" product as used herein may contain about 5–8% moisture and still be free flowing and appear to be dry. The term "dry" should be so construed as to include such "commercially dry" materials.

As in the above cited patent and copending application, the present method is applicable to the group of materials known as "animal by-products." In the present case however, the animal by-products are of the special type that are high in ash content and contain calcium hydroxide, calcium carbonate, and/or tri-calcium phosphate constituting at least about 15–20% of the protein content present. The present method is therefore particularly well suited to the processing of poultry by-products containing leg bones and neck bones, for example, and to the processing of other high bone content materials. Heretofore such by-products have not been used because of the undesirably high ash content of the final product. By employing the present process, the presence of bones, etc. present no problem and the high content is eliminated as described.

The starting animal by-product materials as used in the present method are suitably employed as is, or they may be subjected to a pretreatment such as the removal of electrolytes that may be present where limed or delimed fleshings and trim are employed. In practicing the present invention the selected animal by-products are deposited continuously or in batches in a hydrolysis chamber. At this stage the animal by-products are subjected to hydrolysis with phosphoric acid in aqueous solution at a pH of preferably less than about 2. Hydrolysis of the protein in the animal by-products is promoted by the application of heat such as by injecting steam into the solution or heating by coils or jackets. Suitably, the heat is regulated so that the reaction temperature is under 300° F. and more preferably less than about 250° F. In any event the heat should be adjusted so that the protein is not adversely affected nutritionally.

Hydrolysis of the protein is continued until the protein reaches approximately the polypeptide stage. It should be understood that the protein and protein derivatives at this point are not all in a homogeneous stage, but the term "polypeptide" is intended to cover the average condition of the protein material. Thus some of the protein may be in the form of a peptone and just soluble in water while some of the protein may be converted to the peptide stage.

When the protein has been converted to the polypeptide state, it is removed in aqueous phase from the hydrolysis chamber and further treated as described hereinafter. Portions of the starting animal by-product protein that have not been so converted may be left in the hydrolysis chamber for further hydrolytic treatment until converted to the desired stage. If the liquified protein that is removed from the hydrolysis chamber contains undesired solid portions such as hair of the animal by-products, these may be separated therefrom as by filtering or screening.

During the hydrolysis treatment the fat portions of the animal by-products, by reason of the heat applied, become fluid and liquified. During the removal of the liquified protein and during any screening or filtration which may be employed, the liquified fat is generally obtained along with the aqueous protein phase. In a continuous process, and especially where a great deal of agitation occurs during the hydrolysis step, the protein and liquified fat continuously being removed from the hydrolysis chamber may be in an emulsified condition. Alternatively, and particularly in a batch process where a hydrolysis is executed slowly and without much agitation, a majority of the fat may separate on top of the aqueous phase and can be easily removed. Where such separation does not occur, or where an appreciable emulsification has occurred, separation of the fat may be accomplished by any conventional technique for separating fat from an aqueous phase. For example, the separation may be accomplished by heating the emulsion to "break" it, or electrolytes such as sodium chloride or other commercial emulsion breakers may be used for the same purpose. The fat can also be separated by centrifuging.

The amount of fat removed will depend upon the ultimate consistency of the product desired. When the product is to have a paste consistency, sufficient fat should be left so that the desired homogeneous paste can be obtained. Attention is directed to the above cited patent for specific teachings on the desired stable paste consistency. In any event, the fat level should be adjusted so that it will permit obtaining the desired consistency in the final product.

The separated polypeptide aqueous phase protein which may contain a preselected desired amount of fat is then treated with the selected calcium compound. Calcium carbonate, for example, is added to the solution to bring the pH up to about 5–7 and preferably about 6–7. Insoluble phosphate salts are thereby produced. The precipitated salts are conveniently separated by any suitable technique such as filtering or centrifuging and the remaining solution treated as desired to obtain the final product. Where a paste is desired, the water content is reduced as by evaporation until the paste consistency is produced. Alternatively, and as noted above, where a dry product is desired and a higher ash content can be tolerated, drying is carried as far as possible before the material becomes too tacky for handling. At that point sufficient phosphoric acid and calcium carbonate are added to tie up enough of the remaining water as water of hydration so that the product is rendered dry (commercially dry) and free-flowing. If all of the phosphoric acid initially added for hydrolysis is not neutralized in the precipitation step, the addition of calcium carbonate alone at this point may be required to accomplish the intended purpose.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. A method for preparing a low ash content food supplement rich in protein comprising hydrolyzing animal by-products which contain a member of the group consisting of calcium hydroxide, calcium carbonate, tri-calcium phosphate and mixtures thereof consisting at least about 15–20% by weight of the protein content thereof with phosphoric acid at a pH of about 1–3 in aqueous solution and at an elevated temperature until the protein reaches about the polypeptide state of hydrolysis, recovering an aqueous phase containing polypeptide protein, adding to said recovered aqueous phase, in an amount sufficient to raise the pH of said phase to about 5–7, of a compound selected from the group consisting of calcium oxide, calcium hydroxide, and calcium carbonate, removing the insoluble phosphate salt formed when said compound is added to said aqueous phase protein solution, and then reducing the water content of said aqueous phase protein solution to a preselected amount.

2. A method in accordance with claim 1 wherein said animal by-products contain strontium and wherein said strontium forms an insoluble salt upon the raising of the pH of said phase to about 5–7 for removal with the insoluble phosphate salt.

3. A method for preparing a low ash content food supplement rich in protein comprising hydrolyzing animal by-products which contain a member of the group consisting of calcium hydroxide, calcium carbonate, tri-calcium phosphate and mixtures thereof constituting at least about 15–20% by weight of the protein content thereof with phosphoric acid at a pH of less than about 2 in aqueous solution and at an elevated temperature of less than 300° F. until the protein reaches about the polypeptide state of hydrolysis, recovering an aqueous phase containing polypeptide protein, adding to said recovered aqueous phase protein an amount sufficient to raise the pH of said phase to about 6–7 of a compound selected from the group consisting of calcium oxide, calcium hydroxide and calcium carbonate and to thereby form a substantially insoluble calcium phosphate salt, removing said insoluble calcium phosphate salt from said aqueous phase protein, and then reducing the water content of said aqueous phase protein to a preselected amount.

4. A method for preparing a low ash content food supplement rich in protein comprising hydrolyzing animal by-products which contain a member of the group consisting of calcium hydroxide, calcium carbonate, tri-calcium phosphate and mixtures thereof constituting at least about 15–20% by weight of the protein content thereof with phosphoric acid at a pH of less than about 2 in aqueous solution and at an elevated temperature of less than 300° F. until the protein reaches about the polypeptide state of hydrolysis and the fat is liquified, recovering a liquid phase containing aqueous polypeptide protein and liquified fat, removing a preselected amount of said liquid fat from said recovered liquid phase, adding to said liquid phase an amount sufficient to raise the pH of said phase to about 6–7 of a compound selected from the group consisting of calcium oxide, calcium hydroxide, and calcium carbonate, removing the insoluble phosphate salt when said compound is added to said liquid phase, and then reducing the water content of said liquid phase sufficiently to convert said liquid phase to a paste consistency.

5. A method for preparing a low ash content food supplement rich in protein comprising hydrolyzing animal by-products which contain a member of the group consisting of calcium hydroxide, calcium carbonate, tri-calcium phosphate and mixtures thereof constituting at least about 15–20% by weight of the protein content thereof with phosphoric acid at a pH of less than about 2 in aqueous solution and at an elevated temperature of less than 300° F. until the protein reaches about the polypeptide state of hydrolysis in aqueous phase and the fat is liquified, removing a preselected amount of said liquified fat, then adding to the liquid phase an amount sufficient to raise the pH of said phase to about 6–7 of a compound selected from the group consisting of calcium oxide, calcium hydroxide, and calcium carbonate to precipitate a portion of the mono-calcium phosphate in solution, removing the insoluble phosphate salt, then reducing the water content of the liquid phase, adding a calcium compound selected from the group consisting of calcium oxide, calcium hydroxide, and calcium carbonate and phosphoric acid as required to react with the calcium compound to form hydrated di-calcium phosphate salt, said water reduction step being adjusted so as to leave an amount of water in said liquid phase which yields a substantially dry free-flowing product upon the addition of said last named phosphoric acid and calcium compound thereto.

6. A method in accordance with claim 5 wherein the calcium compound is calcium carbonate.

References Cited
UNITED STATES PATENTS

| | | | |
|---|---|---|---|
| 2,137,365 | 11/1938 | Srong | 99—7 |
| 2,566,549 | 9/1951 | Beckwith et al. | 99—7 |
| 2,617,729 | 11/1952 | Pacault | 99—7 |
| 2,635,104 | 4/1953 | Chayen | 99—7 |
| 2,667,416 | 1/1954 | McFee | 99—7 |
| 2,851,356 | 9/1958 | Bedford | 99—7 |
| 2,946,686 | 7/1960 | Gaver et al. | 99—10 |
| 3,000,742 | 9/1961 | Kuster | 99—7 |
| 3,003,880 | 10/1961 | Erickson | 99—10 |
| 3,114,638 | 12/1963 | Huhn et al. | 99—7 |
| 2,413,815 | 1/1947 | Epstein | 99—18 |

A. LOUIS MONACELL, *Primary Examiner.*

D. DONOVAN, J. M. HUNTER, *Assistant Examiners.*